United States Patent Office 3,501,447
Patented Mar. 17, 1970

3,501,447
SOLID POLY-2-VINYLPYRIDINE-N-OXIDE AND ITS PRODUCTION
Gustav Pieper, Cologne-Stammheim, and Jurgen Johannis, Wuppertal-Elberfeld, Germany, assignors to Farbenfabriken Bayer Aktiengesellschaft, Leverkusen, Germany, a corporation of Germany
No Drawing. Filed June 30, 1966, Ser. No. 574,896
Claims priority, application Germany, July 3, 1965,
F 46,517
Int. Cl. C08f 7/16
U.S. Cl. 260—88.3                                5 Claims

ABSTRACT OF THE DISCLOSURE

Solid poly-2-vinylpyridine-N-oxides, useful for the treatment of silicosis, are obtained from a solution of poly-2-vinylpyridine-N-oxide by reacting the solution with an acid having a dissociation constant $K_c$ above $10^{-4}$, and isolating the precipitated poly-2-vinylpyridine-N-oxide.

---

The present invention is concerned with poly-2-vinylpyridine-N-oxide in solid form as well as with a process for producing said polymer. More particularly, the process concerns the production of solid poly-2-vinylpyridine-N-oxide from a solution of said polymer.

Poly-2-vinylpyridine-N-oxide and the production thereof has assumed increased importance because this polymer has been found to be effective in the treatment of silicosis. It is known to produce poly-2-vinylpyridine-N-oxide in solution but it is to be appreciated that it is advantageous to be able to obtain the polymer in the form of a solid, such as a powder, and the present invention concerns such a process. It is also possible according to the present invention to produce poly-2-vinylpyridine-N-oxide as a viscous, sticky resin, if desired, although it is generally preferable, in view of the ultimate intended use, to be able to obtain the polymer in the form of a solid, filterable powder.

The production of poly-2-vinylpyridine-N-oxide may be accomplished either by polymerizing 2-vinylpyridine and oxidizing the resultant polymer with a suitable oxidizing agent such as hydrogen peroxide, or 2-vinylpyridine-N-oxide may be itself polymerized to obtain poly-2-vinylpyridine-N-oxide in solution. After the oxidation step, there is generally obtained an approximate 5 to 20 percent solution of poly-2-vinylpyridine-N-oxide. The solvent is preferably acetic acid but other suitable solvents may be utilized in its place. Normally the solution may also contain some excess hydrogen peroxide, water, low molecular oxidation and decomposition products, as well as catalysts, and similar auxiliary substances which may have been added during the oxidation process.

Two other suitable solvents which may be used instead of glacial acetic acid are ethyl acetate or isopropyl alcohol, and the general requirement for such a solvent is that it be stable under the conditions of the reaction and possess a sufficient solvent power for the reaction components involved.

Having obtained such a solution, it is possible to remove the solvent generally by distillation, but the poly-2-vinylpyridine-N-oxide then remains as a viscous, sticky resin which is difficult to further process. In addition, decomposition and discoloration may occur due to local overheating.

According to the present invention it has been discovered that the poly-2-vinylpyridine-N-oxide in solution can be converted into a solid form suitable for pharmaceutical use such as in the treatment of silicosis by precipitating the poly-2-vinylpyridine-N-oxide in solution with a precipitating agent selected from the group consisting of aliphatic alcohols, ketones, esters or ethers in the presence of acids having a dissociation constant $K_c$ above $10^{-4}$. The poly-2-vinylpyridine-N-oxide could then be isolated as a salt-like complex by means of these acids.

The precipitated product can either be stored as such or it may be further processed. Neutral aqueous solutions of poly-2-vinylpyridine-N-oxide which are free from salts and other impurities, and which are suitable for treatment of silicosis, for example, by subcutaneous or intramuscular injection, are obtained from the precipitated product by dissolving the polymer in water and treating the polymer with basic exchange resins. It is preferred to use a physiologically and pharmaceutically acceptable acid in the precipitation step and citric acid, for example, has been found to be particularly suitable as the resulting polymer can then be neutralized by admixture with solid alkalies, such as sodium tri- or bicarbonate, to form precipitated salts and, thereby, a product is produced which is easily stored and is a readily water-soluble powder which is in a form which is particularly suitable for the preparation of solutions for inhaling.

While the above process is particularly advantageous when used on solutions of poly-2-vinylpyridine-N-oxide which are obtained by the oxidation of polyvinylpyridine in glacial acetic acid using hydrogen peroxide as the oxidation agent, the present process is also suitable for use on solutions of poly-2-vinylpyridine-N-oxide which have been prepared in other solvents or by other methods. Thus, for example, the present process may be used when 2-vinylpyridine-N-oxide has been polymerized in glacial acetic acid or aliphatic alcohols. If the solutions still contain excess hydrogen peroxide resulting from the oxidation step, it is preferred to remove this excess hydrogen peroxide before carrying out the precipitation step. This may be accomplished by the addition of a carrier catalyst which can easily be separated and, in this regard, finely divided platinum on active charcoal has been found to be particularly suitable.

A wide range of precipitating agents can be utilized in combination with the acids aforedescribed in the preprecipitation step. Particularly suitable precipitating agents are lower aliphatic alcohols, such as ethyl or isopropyl alcohol, aliphatic ketones, such as acetone or methyl ethyl ketone, esters of aliphatic carboxylic acids, such as ethyl acetate, aliphatic ethers, such as diethyl ether. It is preferred that the precipitating agent have a low boiling point so that it can easily be substantially completely removed in the subsequent drying procedure.

Acids which are particularly suitable for use in conjunction with the precipitating agent are those acids which have a dissociation constant $K_c$ above $10^{-4}$ and, in particular, such inorganic acids as hydrochloric acid, sulphuric acid, phosphoric acid or perchloric acid, as well as organic acids such as trichloroacetic acid, citric acid, tartaric acid or oxalic acid are especially suitable. It is preferred that the acids used be non-toxic and thus welltolerated if the resulting poly-2-vinylpyridine-N-oxide is to be used in the treatment of silicosis.

Several different procedures can be utilized for carrying out the precipitation step. For example, the solution of the poly-2-vinylpyridine-N-oxide may be run into a solution of the acid in the precipitating agent while stirring or the acid may be added in the form of a solution in the precipitating agent to the solution of the poly-2-vinylpyridine-N-oxide. In many cases it is also best to mix the whole precipitating agent first with the solution of the poly-2-vinylpyridine-N-oxide and then to bring about the precipitation by the addition of the acid.

Dependent upon the type and quantity of the components used, it is thus possible to obtain the poly-2- vinylpyridine-N-oxide salt either in the form of a viscous resin, if such form is desired, or more preferably, in the form of a solid, filterable powder. The solid, filterable powder is the preferred form because of the ease in handling and further processing the polymer, but it is possible in some instances that it might be desired to obtain the poly-2-vinylpyridine-N-oxide salt in the form of a viscous resin.

N-oxide in acetic acid are stirred into the solutions of acids in the precipitating agents according to the data given in the table. The precipitates were separated by decanting or—as far as possible—by filtration and extracted by again stirring with the same amount of precipitating agent. The precipitated poly-2-vinylpyridine-N-oxide was dried at 20° C./20 mm. Hg over caustic potassium and the equivalent weight determined.

|   | Gram | Acid | Cc. | Precipitating agent | Precipitate | Equiv. wt. |
|---|---|---|---|---|---|---|
| a | 25 | o-Phosphoric acid | 1,000 | Acetone | Powder | 230 |
| b | 25 | do | 500 | Isopropyl-alcohol | do | 235 |
| c | 25 | do | 500 | Ethanol | do | 235 |
| d | 25 | Sulphuric acid | 500 | Acetone | Resin | 150 |
| e | 25 | do | 500 | Ethanol | do | 150 |
| f | 25 | Citric acid | 500 | Acetone | Powder | 180 |
| g | 25 | do | 500 | Isopropyl-alcohol | do | 330 |
| h | 25 | do | 500 | Ethanol | Resin | 200 |
| i | 25 | do | 750 | do | Powder | 320 |
| j | 25 | do | 400 | Acetone | Resin | 200 |

According to the above described process, comparatively small amounts of precipitating agent are required for the precipitation of the poly-2-vinylpyridine-N-oxide from its solution. In general, it has been found that a ratio of one part by volume poly-2-vinylpyridine-N-oxide solution to two to four parts by volume precipitating agent will be sufficient to achieve a complete precipitation which can readily be processed thereafter. The amount of acid to be employed in conjunction with the precipitating agent can vary between 0.1 and 10.0 acid equivalents for one nitrogen atom in the poly-2-vinylpyridine-N-oxide. A fractional precipitation can be carried out for the simultaneous separation of low molecular weight components.

The following non-limitative examples more particularly illustrate the present invention.

EXAMPLE 1

1950 g. of polyvinylpyridine (viscosity number [$\eta$] 2.58 at 25° C. in dimethyl formamide) are dissolved in 20 liters glacial acetic acid and the solution is oxidized with 2150 cc. 30% hydrogen peroxide at 50° C. for seven hours. The excess hydrogen peroxide is decomposed by the addition of a carrier catalyst (5% platinum on active charcoal). After filtration a 8.8 percent solution of poly-2-vinylpyridine-N-oxide is obtained, the pyridine residue of which are oxidized to 90 percent to the N-oxide.

Ten liters of this solution are added, with rapid stirring, to a solution of 1 kg. ortho-phosphoric acid in 20 liters acetone. The poly-2-vinylpyridine-N-oxide is immediately precipitated in the form of a coarse-grain, well-settling powder and is, after decanting the liquid, extracted by stirring with a further 10 liters acetone. After suction-filtration and drying at 20° C./20 mm. Hg over solid caustic alkali, there are obtained 1580 g. of a 55 percent poly-2-vinylpyridine-N-oxide, the equivalent weight of which lies at 210 when titrated with sodium hydroxide in aqueous solution with methyl orange as indicator.

EXAMPLE 2

Amounts of 250 cc. each of the 8.8 percent solution, obtained according to Example 1, of poly-2-vinylpyridine-

What is claimed is:

1. A process for the formation of a complex salt of solid poly-2-vinylpyridine-N-oxide from a solution thereof which comprises adding to the solution a precipitating agent selected from the group consisting of aliphatic alcohols, ketones, esters and ethers in the presence of an acid having a dissociation constant $K_c$ above $10^{-4}$ and recovering precipitated poly-2-vinylpyridine-N-oxide in the form of a salt-like complex with the acid.

2. A process according to claim 1 wherein the acid is hydrochloric acid, sulphuric acid, phosphoric acid, perchloric acid, trichloroacetic acid, citric acid, tartaric acid or oxalic acid.

3. A process according to claim 1 wherein the precipitating agent is ethanol, isopropyl alcohol, acetone, methyl ethyl ketone, ethyl acetate, or diethyl ether, and the acid is hydrochloric acid, sulphuric acid, phosphoric acid, perchloric acid, trichloroacetic acid, citric acid, tartaric acid or oxalic acid.

4. A process according to claim 3 wherein the precipitating agent is present in a ratio of 1 part by volume poly-2-vinylpyridine-N-oxide solution to 2 to 4 parts by volume precipitating agent and the acid is present in an amount of from 0.1 to 10 acid equivalents for one nitrogen atom in the poly-2-vinylpyridine-N-oxide.

5. A process according to claim 1 wherein the aliphatic alcohol is a lower alkanol, the ketone is acetone or methyl ethyl ketone, the ester is ethyl acetate and the ether is diethyl ether.

References Cited

UNITED STATES PATENTS

| 2,749,349 | 6/1956 | Cislak | 260—88.3 |
| 2,868,797 | 1/1959 | Cislak | 260—88.3 |
| 3,058,959 | 10/1962 | Bailey et al. | 260—88.3 |
| 3,285,892 | 11/1966 | MacKenzie et al. | 260—88.3 |

HARRY WONG, JR., Primary Examiner

U.S. Cl. X.R.

167—65; 260—29.6, 31.2